Jan. 28, 1964 A. ZALMAN 3,119,564
COMBINATION KEY HOLDER AND ILLUMINATING MEANS
Filed Aug. 6, 1962 3 Sheets-Sheet 2
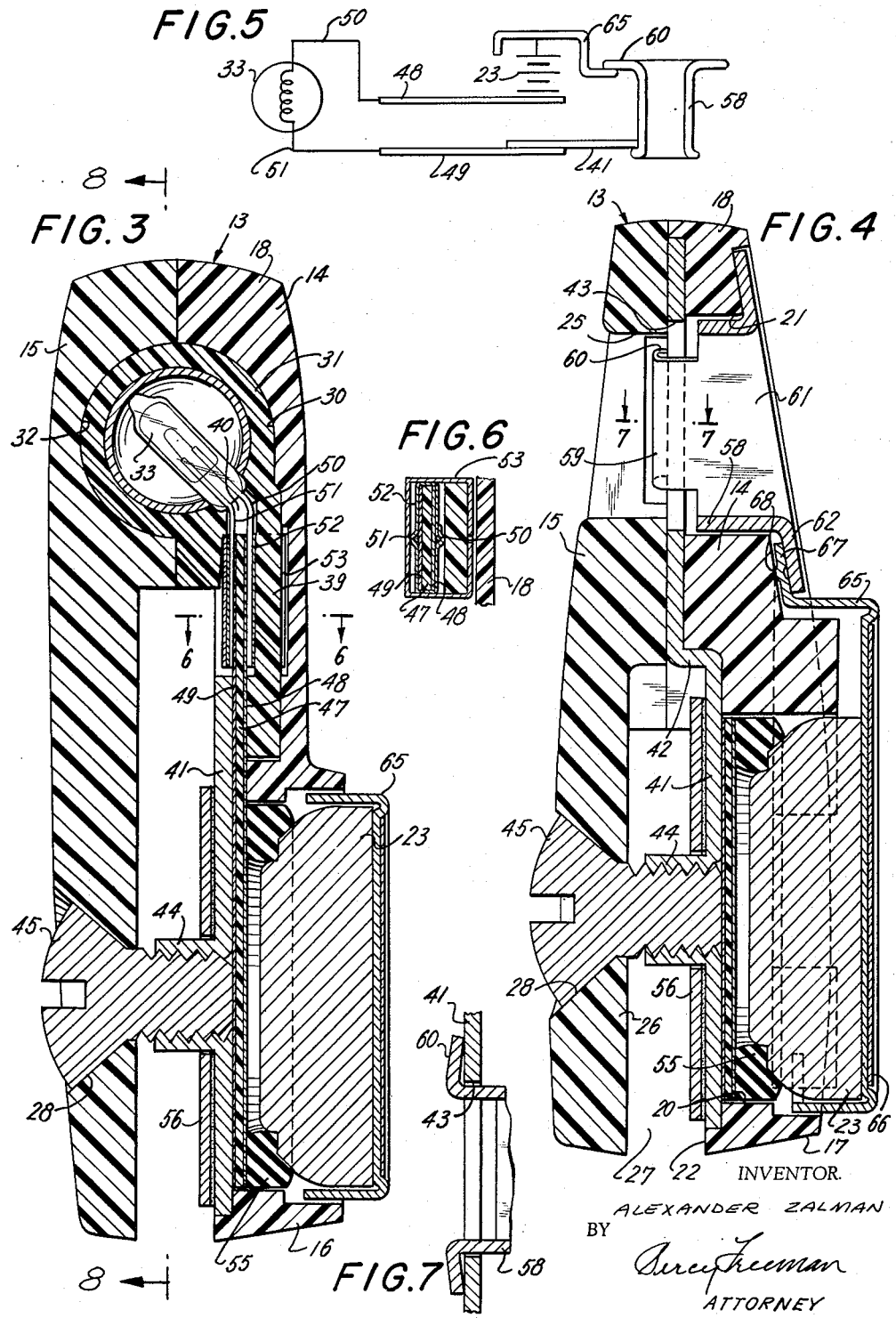
INVENTOR.
ALEXANDER ZALMAN
BY
Percy Freeman
ATTORNEY

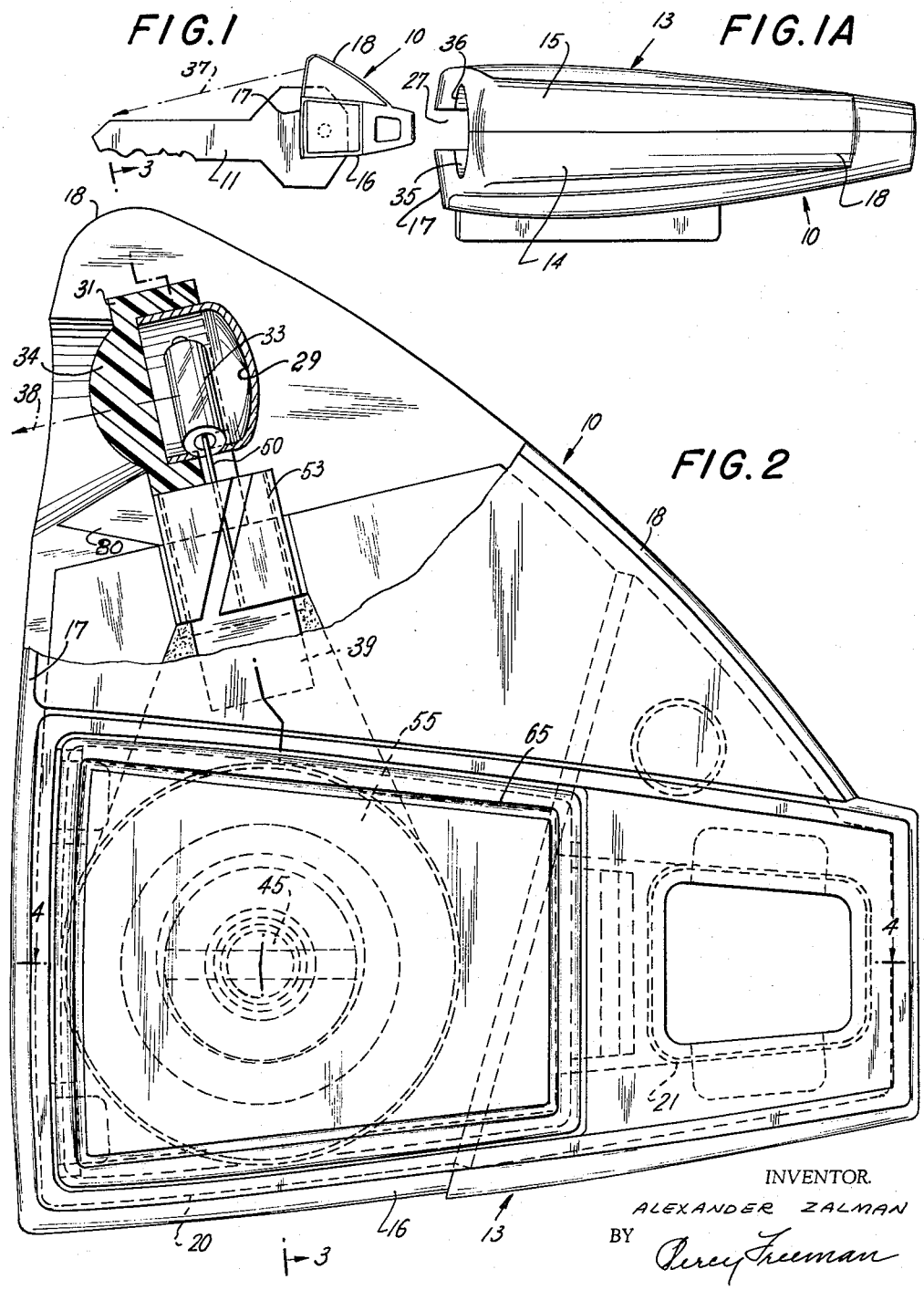

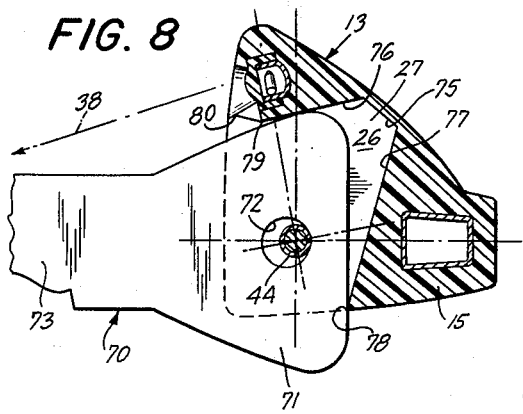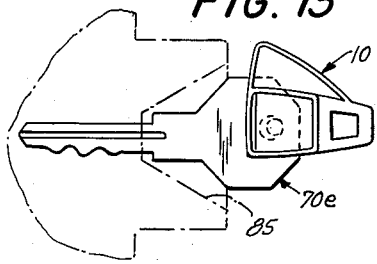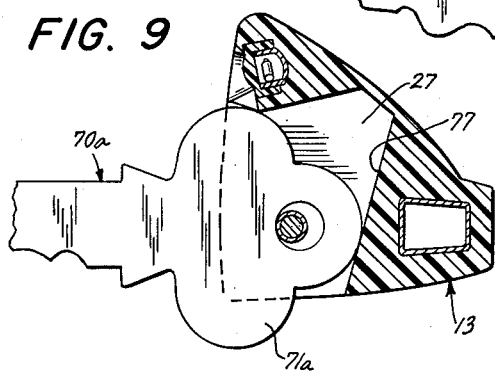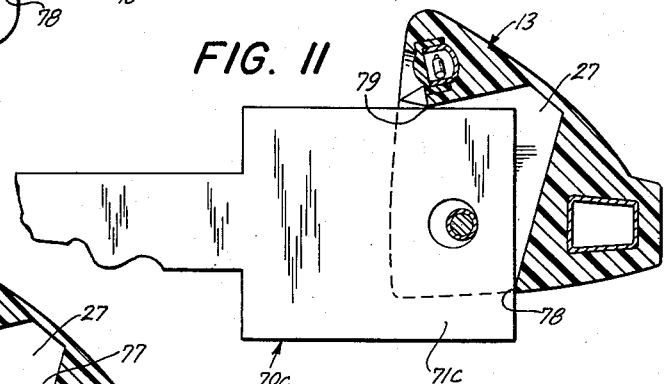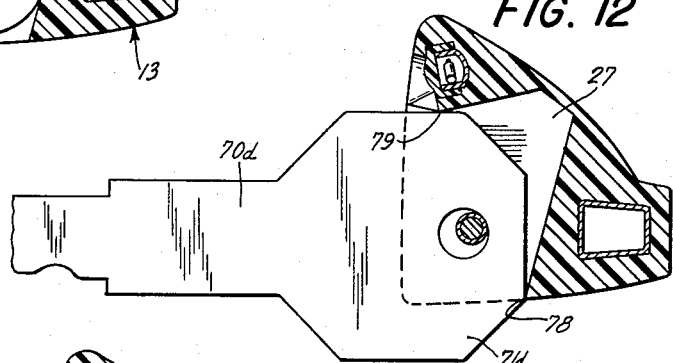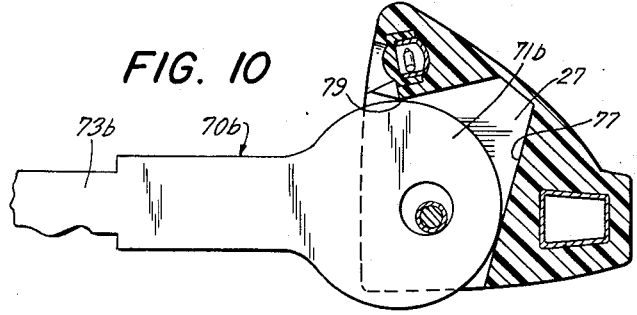

United States Patent Office 3,119,564
Patented Jan. 28, 1964

3,119,564
COMBINATION KEY HOLDER AND
ILLUMINATING MEANS
Alexander Zalman, Jamaica, N.Y., assignor to Flex Electric Products, Inc., Long Island City, N.Y., a corporation of New York
Filed Aug. 6, 1962, Ser. No. 215,049
10 Claims. (Cl. 240—6.4)

This invention relates to keyholders and is especially concerned with a combination keyholder and illuminating means.

It is an important object of the present invention to provide a unique keyholder construction incorporating therein means for illuminating a keyhole to facilitate entry of a key carried by the keyholder.

It is a further object of the present invention to provide an illuminated keyholder of the type described, which is extremely simple in construction, having a minimum of parts, durable and entirely reliable throughout a long useful life, and which can be economically manufactured for sale at a reasonable price.

Still a further object of the present invention resides in the provision of a keyholder having self-contained battery-operated illuminating means, which is extremely compact so as to occupy a minimum of space in a user's pocket, light in weight, and which operates substantially automatically upon normal key usage.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a side elevational view showing a keyholder of the present invention in conjunction with a key.

FIGURE 1A is a top plan view showing the instant keyholder apart from a key and somewhat enlarged.

FIGURE 2 is a side elevational view similar to FIGURE 1, but showing the keyholder apart from a key and greatly enlarged, with parts broken away for clarity of understanding.

FIGURE 3 is a sectional view taken generally along the line 3—3 of FIGURE 2.

FIGURE 4 is a sectional view taken generally along the line 4—4 of FIGURE 2.

FIGURE 5 is a schematic illustration of the electrical circuit of the instant keyholder.

FIGURE 6 is a fragmentary sectional view taken generally along the line 6—6 of FIGURE 3.

FIGURE 7 is a fragmentary sectional view taken generally along the line 7—7 of FIGURE 4.

FIGURE 8 is a sectional view taken generally along the line 8—8 of FIGURE 3 and showing a key in the instant keyholder.

FIGURES 9-12 are similar to FIGURE 8 and illustrate various types of keys in the instant keyholder.

FIGURE 13 shows a keyholder and key of the present invention, the key being inserted in a recessed lock.

Referring now more particularly to the drawings, and specifically to FIGURES 1 and 1A, a keyholder is there generally designated 10 and is shown in FIGURE 1 as attached to a key 11. The keyholder 10 includes a body 13 which may be formed of a pair of non-conductive body parts 14 and 15, which may be molded of plastic, or formed otherwise of any suitable material.

The body parts 14 and 15 may be of generally congruent triangular configuration and arranged in complementary facing relation with each other. More specifically, the body part 14 is configured to provide a lower edge 16, generally horizontal in the drawings, a forward edge 17 upstanding from the front end of the lower edge, and a top edge 18 declining rearward from the upper end of the forward edge to the rear end of the lower edge. A pair of spaced-apart, through openings 20 and 21 are formed in the body part 14, the former being located along the lower edge 16 adjacent to the front edge 17, and the latter being proximate to the juncture of lower edge 16 and upper edge 18. The hole or opening 20 extends inward from the outer side of the body part 14 through the latter and opens on the inner side thereof into a recess 22 at the juncture of and extending inward from bottom edge 16 and front edge 17. As will appear presently, the opening 20 provides a receptacle for a battery 23.

The body part 15 is formed with a through hole 25 in alignment with the hole or opening 21, and is also provided with a recess 26 on its inner side at its lower front corner in facing relation with the recess 22 of body part 14. Thus, the facing recesses 22 and 26 combine to define an edgewise cutout or slot at the front lower corner of the body 13. A fastener-receiving hole 28 may be formed in the body part 14 opening therethrough into the slot 27.

The body part 15 is provided on its inner side in the corner region adjacent to the juncture of edges 17 and 18 with a recess 30 receiving a combined lamp housing and lens 31. A complementary recess 32 is formed on the inner side of the upper front region of body part 14, also for receiving the combined lamp housing and lens 31. Interiorly of the lamp housing 31 is mounted a lamp 33, while the forward region of the lamp housing is configured to serve as a lens, at 34. In front of the lens 34 the body parts 14 and 15 are recessed or cut away, as at 35 and 36, which cutouts or recesses open into the upper end of slot 27 and define a passageway for projection of a light beam from lamp 33, as indicated by the broken line 37 (FIG. 1). Rearward of the lens 34 may be provided a generally cup-shaped reflector 29.

As best seen in FIGURES 2 and 3, the lamp housing 31 is located in the upper front corner of the body 13, spaced from the body openings 20 and 21. However, the lamp housing 31 includes an extension or leg 39 (FIG. 3) received in the recess 30 and extending generally toward the opening 20, but terminating short of the latter. The leg 39 is provided with an internal hollow 40, for a purpose appearing presently.

A metal or otherwise conductive mounting plate 41 is disposed in facing engagement with the inner side of body part 14, being conformably received thereagainst, and extending along the lower edge 16 across the openings 20 and 21. As best seen in FIGURE 4, the mounting plate 41 is sandwiched between the inner sides of body parts 14 and 15 in the region of holes 21 and 25, and the mounting plate is offset, as at 42 so as to lie against the inner side of body part 14 within the slot 27. In alignment with the body-part holes 21 and 25, the mounting plate 41 is formed with a through opening or hole 43, while an internally threaded tubular formation 44 is provided on the mounting plate in the slot 27 substantially aligned with the hole 28 of body part 15. A threaded pin or screw 45 is removably engageable through the opening 28 for threaded securement in the tubular portion or lug 44.

An insulating contact board 47 (FIG. 3) extends across the opening 20, between the body part 14 and mounting plate 41, and enters into the hollow 40 of lamp-housing leg 39. The contact board has its opposite faces provided with conductive coatings, as at 48 and 49, the former facing toward the body part 14 into the opening 20, and the latter facing toward and engaging with the mounting plate 41. A pair of conductors or wires 50 and 51 extend from the lamp 33 into the hollow 40 on opposite sides of the contact board 47 and are secured in electrical contact with conductive faces 48 and 49, respectively, as by a tape 52 encircling the contact board and conductors, or other suitable means. This assembly of contact board 47, conductors 50 and 51, tape 52, and lamp-housing leg 39 may all be secured together by any suitable means, such as a band 53.

Interposed in the opening or receptacle 20 of body part 14, adjacent to the conductive surface 48 of contact board 47 is a resiliently yieldable spacer or battery-mounting ring 55. The ring or resilient spacer 55 may be a rubber annulus, if desired, or may be fabricated of other suitable insulating material. In addition, a washer 56 may be circumposed about the internally threaded lug 44, and adhesively or otherwise suitably secured to the mounting plate 41 interiorly of the slot 27, to provide an adaptor or spacer for snug reception of keys 11 of varying thickness.

As will now be appreciated, the mounting plate 41 is detachably secured to the body part 15 by the threaded pin or screw 45. Securing the mounting plate 41 to the body part 14 is an annular or tubular fastener or eyelet 58. The eyelet 58 is located generally within the opening 21 of body part 14 and has one end 59 extending through the mounting-plate hole 43 into the opening 25 and there upset or flanged, as at 60, against the mounting plate. The other end 61 of the fastener or eyelet 58 is upset or flanged, as at 62, against the outer side of the body part 14, to thereby firmly secure the latter body part to the mounting plate. Also, the tubular fastener or eyelet 58 provides for reception of a key chain or the like.

Disposed within the opening or receptacle 20 of body part 14 is the battery 23, which seats yieldably on the mounting spacer 55 and is depressible thereagainst into contact with the conductive board coating 48.

A manually actuable battery depressor 65 engages over the exterior of the battery 23 in electrical contact therewith. That is, the depressor 65 is of metal or other conductive material and may be provided on its outer side with a nonconductive cover 66 for finger pressure. The depressor 65 may be generally cupped, as best seen in FIGURES 3 and 4, and may be provided with a mounting extension or lip 67 engaged between the eyelet flange 62 and nether surface of body part 14. Thus, the flange 62 serves to retain the depressor 65 in its covering engagement with the battery 23, and the extension or lip 67 may be dimpled or otherwise formed, as at 68, to rockably anchor the extension and provide for depressor movement toward and away from the battery receptacle 20.

The electrical circuit is seen in FIGURE 5, wherein the lamp 33 has one conductor 51 connected to one contact board coating 49, which engages with the mounting plate 41 and the latter in turn engages one end of the eyelet fastener 58. The other lamp conductor 50 is electrically connected to the other contact board coating 48, while the conductive depressor or button 65 is electrically connected to the eyelet fastener 58 and movable to electrically connect and disconnect the battery 23 with respect to the board coating 48 and depressor. Thus, an electrical circuit is selectively closed and opened upon depression and release of the button or depressor 65, to project the light beam 38 as desired. The screw 45 is removable to permit insertion of the key 11 into the slot 27, whereupon the screw is replaced to retain the key in position.

It is now understood that a key may be quickly and easily attached to and detached from the keyholder 10 by mere removal of the screw or fastener 45 and separation of the body parts 14 and 15. In this condition, the apertured head of a key may be engaged about or removed from the lug 44. With a key head engaged on the lug 44 and in facing engagement with a washer or spacer 56, the body part 15 may be returned to its mating relation with the body part 14, and the fastener 45 engaged through the hole 28 and in the lug 44, thereby assembling the keyholder and securely clamping a key head in the slot 27.

In FIGURE 8 is shown the body part 15 and illustrating the recess 26 thereof, which recess is complementary to the recess 22 of body part 14 and combines therewith to define the slot 27. A key 70 is shown in FIGURE 8 as having its head 71 positioned in the slot 27 with the lug or pin 44 passing through the hole 72 of the key head. The remainder or shank 73 of the key 70 projects from the body 13 of the keyholder in a direction to locate its end in the light beam 38.

As the recess 26 of body part 15 is similar and complementary to the recess 22 of body part 14, the recess 26 may be considered as the slot 27 for purposes of describing FIGURES 8-12. Thus, the slot 27 as seen in FIGURE 8 is of generally outwardly flaring configuration having a back wall 75 from the opposite ends of which extend a pair of outwardly divergent side walls 76 and 77. The side wall 77 extends obliquely downward and forward toward the lower edge of the body 13 and terminates at the lower body edge, there defining a contact point 78. The side wall 76 extends forwardly and downwardly toward the forward edge of the body 13 and terminates short of the latter at a contact point 79, an additional side wall 80 extending from the contact point 79 forwardly and upwardly to the forward edge of the body 13. Thus, it will be appreciated that the slot 27 is defined between the outwardly divergent side walls 76 and 77 which extend on opposite sides of the retaining pin or stud 44, and that an additional side wall 80 extends from the point 79 sharply away from the retaining pin.

The key 70 is of a triangular head configuration, and when received in the slot 26 engages with the contact point 78 and the side wall 76 proximate to the contact point 79 to effectively locate the key with its shank 73 entering the light beam 38. As noted hereinbefore, tightening of the fastener element 45 serves to clamp a received key head in position in slot 27 to insure retention of the desired relationship between keyholder and key.

In FIGURE 9 is shown a key 70a having a head 71a of clover-leaf configuration received in the slot 27. It is there seen that the key head 71a engages the slot side wall 77 and the additional slot side wall 80 for proper location relative to the keyholder body 13.

In FIGURE 10 is shown a key 70b with a round head 71b received in slot 27. The round head 71b engages with the side wall 77 and the contact point 79 for proper location of the head and projection of the key stem 73b.

In FIGURE 11 is shown a key 70c having a square or rectangular head 71c engaged in slot 27 of the body 13. The key head 71c is properly located in the slot by engagement with the contact points 78 and 79.

An octagon head 71d of a key 70d is shown in FIGURE 12 as received in recess 27. The octagon head 71d engages contact points 78 and 79 for proper location in the recess.

Thus, from FIGURES 8-12 it is apparent that virtually all shapes of keys may be received in and properly located by the configuration of slot 27, with the key-retaining pin or stud 44 passing through the key-head aperture. Of course, the proper thickness of spacer washer 56 and clamping action thereagainst serves to prevent undesired key movement relative to the keyholder.

It should also be observed that the instant keyholder 10 is connected to a key at a location well toward the rear of the key, so as to permit key insertion even into recessed locks. This condition is shown in FIGURE 13, where a recessed lock is illustrated in phantom at 85, with a key 70e fully inserted in the lock, and carrying a keyholder 10. Thus, in this case the keyholder, by its rearward extension from the key, affords greater grasping surface for a user's hand, to facilitate key operation.

From the foregoing, it is seen that the present invention provides an illuminated keyholder which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An illuminated keyholder comprising a non-conductive body having an outwardly opening battery receptacle, a conductive mounting plate carried by said body, a conductive fastener in engagement with and securing said mounting plate to said body, a lamp mounted in said body spaced from said mounting plate and fastener, a pair of conductors extending from said lamp, one of said conductors extending into said receptacle and the other being connected to said mounting plate, resilient battery-mounting means in said receptacle to mount a battery for resilient depression into engagement with said one conductor, and a conductive battery depressor exteriorly of said receptacle and electrically connected to said fastener for depressing engagement with a battery in said receptacle, whereby a circuit is closed and opened through said lamp upon depression and release of said depressor.

2. An illuminated keyholder according to claim 1, said fastener comprising an eyelet for receiving a key chain.

3. An illuminated keyholder according to claim 1, said battery-mounting means comprising a resiliently yieldable spacer interposed between said one conductor and a battery.

4. An illuminated keyholder according to claim 1, said fastener comprising an eyelet having one end extending through and overlying said mounting plate and having its other end extending through and overlying said body, and said depressor including an extension rockably anchored beneath said other eyelet end for movement of said depressor into and out of said battery-depressing engagement.

5. An illuminated keyholder according to claim 1, said body being formed with a slot in the region of said mounting plate for receiving a key, and a retainer pin extending through said slot and detachably secured to said mounting plate for retaining a key in said slot.

6. An illuminated keyholder according to claim 5, said slot being configured to provide a pair of outwardly diverging side walls terminating in contact points on opposite sides of said retaining pin for rotation-limiting engagement with keys of various head shapes.

7. An illuminated keyholder according to claim 6, said slot having an additional wall extending from one of said contact points sharply away from said retaining pin for rotation-limiting engagement with a clover-head key on said pin.

8. An illuminated keyholder comprising a non-conductive body part having a pair of spaced through openings, a conductive mounting plate in facing engagement with said body part extending across said openings and having a hole in registry with one of said openings, a conductive fastener extending through said one opening and hole securing together said body part and mounting plate and electrically connected to the latter, a lamp mounted in said body part spaced from said openings, a pair of conductors extending from said lamp, one of said conductors extending into the other of said openings and the other conductor being connected to said mounting plate resilient battery-mounting means in said other opening to mount a battery for resilient depression into engagement with said one conductor, and a conductive battery depressor adjacent to said other opening and electrically connected to said fastener for depressing engagement with a battery in said other opening, whereby a circuit is closed and opened through said lamp upon depression and release of said depressor.

9. An illuminated keyholder according to claim 6, in combination with an additional non-conductive body part in facing spaced relation with said mounting plate, and a screw extending through said additional body part into threaded engagement with said mounting plate for retaining a key in the space between said mounting plate and additional body part.

10. An illuminated keyholder according to claim 6, said battery-mounting means comprising a resiliently yieldable spacer interposed between said one conductor and a battery, said fastener comprising an eyelet having one end extending through and overlying said mounting plate and having its other end extending through and overlying said body part, and said depressor including an extension rockably anchored beneath said other eyelet end for movement of said depressor into and out of battery-depressing engagement.

References Cited in the file of this patent

UNITED STATES PATENTS

| | | |
|---|---|---|
| 1,795,291 | Dunn | Mar. 10, 1931 |
| 1,972,880 | Flintermann | Sept. 11, 1934 |
| 1,995,141 | Barber et al. | Mar. 19, 1935 |
| 2,500,198 | Mullan | Mar. 14, 1950 |
| 2,547,524 | Gross | Apr. 3, 1951 |
| 2,640,347 | Majeski | June 2, 1953 |
| 2,738,668 | Rock | Mar. 20, 1956 |
| 2,992,487 | Miller | July 18, 1961 |
| 3,085,149 | Giwosky | Apr. 9, 1963 |